(12) United States Patent
Chakraborty et al.

(10) Patent No.: US 12,135,706 B2
(45) Date of Patent: *Nov. 5, 2024

(54) COMPUTATION SYSTEM WITH CONSISTENCY BASED PROBABILITIES

(71) Applicant: Workday, Inc., Pleasanton, CA (US)

(72) Inventors: Sayan Chakraborty, Niwot, CO (US); Jonathan David Ruggiero, Danville, CA (US)

(73) Assignee: Workday, Inc., Pleasanton, CA (US)

( * ) Notice: Subject to any disclaimer, the term of this patent is extended or adjusted under 35 U.S.C. 154(b) by 408 days.

This patent is subject to a terminal disclaimer.

(21) Appl. No.: 16/567,997

(22) Filed: Sep. 11, 2019

(65) Prior Publication Data
US 2021/0073201 A1 Mar. 11, 2021

(51) Int. Cl.
*G06F 16/23* (2019.01)
*G06N 7/01* (2023.01)

(52) U.S. Cl.
CPC .......... *G06F 16/2365* (2019.01); *G06N 7/01* (2023.01)

(58) Field of Classification Search
CPC ............................ G06F 16/2365; G06N 7/005
USPC ....................................................... 707/690
See application file for complete search history.

(56) References Cited

U.S. PATENT DOCUMENTS

| | | | | |
|---|---|---|---|---|
| 8,676,731 B1 * | 3/2014 | Sathyanarayana | ..... | G06V 30/40 706/12 |
| 8,862,492 B1 * | 10/2014 | Kulshreshtha | ......... | G06Q 50/01 705/7.38 |
| 10,936,643 B1 * | 3/2021 | Alspaugh | ................ | G06F 9/542 |
| 2005/0144042 A1 | 6/2005 | Joffe | | |
| 2010/0106724 A1 * | 4/2010 | Anderson | .............. | G06N 20/00 707/E17.046 |
| 2011/0098846 A1 | 4/2011 | Yeung | | |
| 2012/0158678 A1 * | 6/2012 | McGraw | ............... | G06F 16/215 707/694 |
| 2012/0303555 A1 * | 11/2012 | Yakout | .................. | G06F 16/215 707/E17.046 |
| 2014/0143206 A1 * | 5/2014 | Pittelko | ................. | G06F 16/137 707/634 |
| 2014/0282893 A1 | 9/2014 | Sheller | | |

(Continued)

OTHER PUBLICATIONS

Heinrich Bernd et al: "Metric-based data quality assessment—Developing and evaluating a probability-based currency me", Decision Support Systems, Elsevier, Amsterdam, NL, vol. 72, Feb. 16, 2015 (Feb. 16, 2015), pp. 82-96.

*Primary Examiner* — Hosain T Alam
*Assistant Examiner* — Nicholas E Allen
(74) *Attorney, Agent, or Firm* — Van Pelt, Yi & James LLP

(57) ABSTRACT

A system for maintaining consistency of a data value using a probability includes an interface and a processor. The interface is configured to receive a data value for storing. The processor is configured to store the data value in a data element of a data structure and determine, using an adaptive filter, a probability of certainty associated with the data value. The adaptive filter receives a previously stored data value in a previously stored data element of a previously stored data structure as input to determine the probability of certainty associated with the data value. The adaptive filter provides as output the probability of certainty. The processor is further configured to store the probability of certainty associated with the data value in the data structure.

24 Claims, 13 Drawing Sheets

(56) References Cited

U.S. PATENT DOCUMENTS

| | | | |
|---|---|---|---|
| 2015/0058337 A1* | 2/2015 | Gordon | G06N 7/01 |
| | | | 707/769 |
| 2016/0110249 A1 | 4/2016 | Orme | |
| 2017/0236060 A1* | 8/2017 | Ignatyev | G06N 20/00 |
| | | | 706/46 |
| 2017/0351543 A1* | 12/2017 | Kimura | G06F 3/0659 |
| 2017/0365000 A1 | 12/2017 | Wittkotter | |
| 2018/0247227 A1* | 8/2018 | Holtham | G06K 9/6215 |
| 2018/0268015 A1* | 9/2018 | Sugaberry | G06N 5/003 |
| 2019/0050445 A1* | 2/2019 | Griffith | G06F 16/2365 |
| 2019/0150803 A1 | 5/2019 | Vanslyke | |
| 2019/0171732 A1* | 6/2019 | Yanez | G06N 20/00 |
| 2019/0243743 A1* | 8/2019 | Saxena | G06F 11/0766 |
| 2019/0258707 A1 | 8/2019 | Terra | |
| 2019/0340520 A1 | 11/2019 | Oyamada | |
| 2019/0361890 A1* | 11/2019 | Rogynskyy | H04M 15/41 |
| 2020/0012811 A1 | 1/2020 | Walters | |
| 2021/0004356 A1 | 1/2021 | Trim | |

* cited by examiner

| | 400 | 402 | 404 | 406 | 408 | 410 |
|---|---|---|---|---|---|---|
| ID | Street | City | State | Zip Code | Country |
| 234522 | 22222 Green Parkway | Los Angeles | California | 90210 | USA |
| | 60% | 70% | 70% | 70% | 70% |
| 234525 | 4592 Reds Road | Los Angeles | California | 90210 | USA |
| | 60% | 70% | 70% | 70% | 70% |
| 234539 | 15973 Angel Drive | Los Angeles | California | 90210 | USA |
| | 60% | 70% | 70% | 70% | 70% |
| 234547 | 84 Shady Glen | Los Angeles | California | 90210 | USA |
| | 60% | 70% | 70% | 70% | 70% |

Fig. 4

COMPUTATION SYSTEM WITH CONSISTENCY BASED PROBABILITIES

BACKGROUND OF THE INVENTION

A database system stores data accumulated over time. For example, a database system stores human resources system data, financial system data, log data, user data, behavior data, manufacturing data, etc. The database system provides functionality for adding new data, searching within the stored data, building reports based on the data, etc. Each data entry in the database system may or may not be correct. For example, the data might have been entered incorrectly or the true value of the data might have changed without the database value of the data being updated. Incorrect data in a database causes a large number of problems; however, it is unwieldy to verify the correctness of all data in a large database.

BRIEF DESCRIPTION OF THE DRAWINGS

Various embodiments of the invention are disclosed in the following detailed description and the accompanying drawings.

FIG. 4 is a block diagram illustrating an embodiment of data stored in a table.

DETAILED DESCRIPTION

Figure 1:
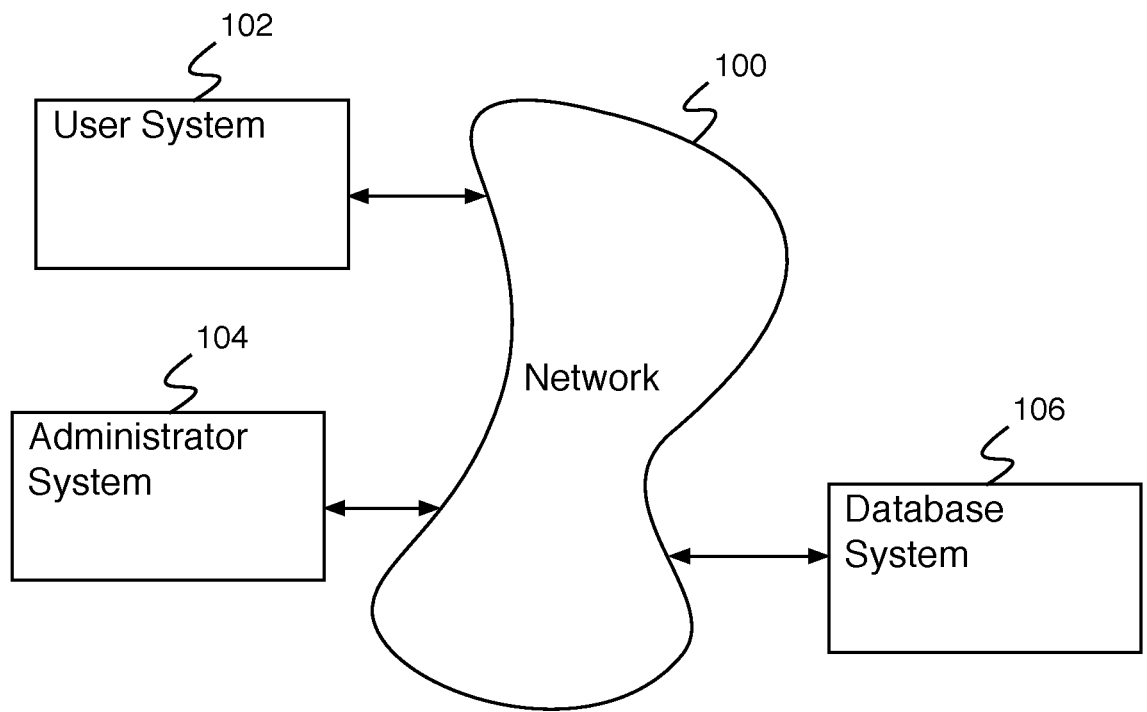
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for maintaining consistency of a data value using a probability comprises an interface and a processor. The interface is configured to receive a data value for storing. A processor is configured to store the data value in a data element of a data structure, determine a probability of certainty associated with the data value, wherein the probability of certainty associated with the data value is based at least in part on consistency with a previously stored data value in a previously stored data element of a previously stored data structure, and store the probability of certainty associated with the data value in the data structure.

A system for maintaining consistency of a data value using a probability comprises an interface and a processor. The interface is configured to receive a data value for storing. The processor is configured to store the data value in a data element of a data structure, and determine, using an adaptive filter, a probability of certainty associated with the data value. The probability of certainty associated with the data value depends on a time since the data value was updated. The adaptive filter provides as output the probability of certainty. The probability is also configured to store the probability of certainty associated with the data value in the data structure.

A computation system with consistency based probabilities comprises a system for storing data. For example, a computation system with consistency based probabilities comprises a database system. Each stored data element is stored associated with a probability of certainty. In some cases, the system also determines an error in the probability of certainty. The probability of certainty comprises an estimate by the computation system that the data element is correct. The probability of certainty is based at least in part on a consistency—for example, a consistency with a set of other similar data elements. The probability of certainty is also based at least in part on time—for example, a time since the data value was last updated, verified, or otherwise validated. In some embodiments, the probability of certainty value diminishes since a time the data value was last updated, verified, or otherwise validated. In various embodiments, the data value decreases linearly, decays exponentially, decreases in a polynomial manner, or in any other appropriate manner. In some embodiments, the probability of certainty is based on other factors. When a data value is received for storage in the computation system, the data value is stored, a probability of certainty is determined for the data value, and the probability of certainty is stored. For example, determining the probability of certainty comprises determining a set of related previously stored data values and determining the consistency between the data entry and each of the related previously stored data values. Related previously stored data values comprise data values that could be expected to have data values related to the received data value. For example, for an employee zip code data, related data values comprise zip code data for other similar employees (e.g., other employees that work in the same location, other employees with other similar address data, etc.). Data value consistency comprises a similarity determination, for example, whether the data value and the related previously stored data value are identical, are analogous, are distinct, or are disparate. In response to a determination of a consistency between the data value and the related previously stored data value the probability of certainty associated with the data value is adjusted accordingly (e.g., in the event it is determined that the data value and the related previously stored data value are identical, the probability of certainty is adjusted upwards). In some embodiments, the probability of certainty is determined based at least in part on a model (e.g., a Kalman filter model, a Markov model, an applied optimal estimation model, a machine learning model, or a neural network model).

After determination, the probability of certainty can be compared with a threshold probability (e.g., a minimum acceptable probability of certainty). In the event the probability of certainty is determined to be less than the threshold probability, the data value is marked as invalid. In the event it is indicated that a new value should be automatically determined for an invalid data value, a new value is determined. For example, a new value is determined based at least in part on the set of related previously stored data values or based at least in part on a model. In the event it is indicated that a new value should not be automatically determined for an invalid data value, a user is prompted to correct the data value. In this way, invalid data can be identified and corrected while requiring a minimum of input from a user (e.g., the user is only required to check and correct data entries with a determined probability of certainty less than a threshold, as opposed to all data entries).

In some embodiments, the data value and/or the probability of certainty is/are updated using a model. In some embodiments, the error associated with the probability of certainty is minimized by the model when determining data value(s) and/or probability(ies) of certainty. In some embodiments, the probabilities of certainty are updated constantly as the data values are updated, modified, and/or entered.

The system for maintaining consistency of a data value using a probability improves the computer by automatically determining data values stored by the computer with a high probability of incorrectness. For a large data storage system, this allows the data to be checked for correctness without requiring a user to manually check every data entry. When adding a large quantity of data to a database system (e.g., when moving from a first database software tool to a second database software tool) many errors can be present, requiring an administrator to spend a great deal of time checking for the errors. The system for maintaining consistency of a data value using a probability minimizes the time checking for errors and enables automatic correction of the errors when possible.

FIG. 1 is a block diagram illustrating an embodiment of a network system. In some embodiments, the network system of FIG. 1 comprises a network system for a system for maintaining consistency of a data value using a probability. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, and database system 106 communicate via network 100. User system 102 comprises a user system for use by a user. For example, user system 102 comprises a desktop computer, a laptop computer, a tablet computer, a smartphone, etc. User system 102 stores and/or accesses data on database system 106. A user uses user system 102 to interact with database system 106, for example to store database data, to request database data, to create a report based on database data, to create a document, to access a document, to execute a database application, etc. For example, a user uses user system 102 to provide data for storage in database system 106. Administrator system 104 comprises an administrator system for use by an administrator. An administrator utilizes administrator system 104 to administrate a network system—for example, installing applications, configuring applications, configuring an operating system, modifying user privileges, etc. Database system 106 comprises a database system for storing data, providing data, executing database applications, preparing reports, etc. Database system 106 comprises a system for maintaining consistency of a data value using a probability. For example, database system 106 comprises an interface configured to receive a data value for storing, and a processor configured to store the data value in a data element of a data structure, determine a probability of certainty associated with the data value, wherein the probability of certainty associated with the data value is based at least in part on consistency with a previously stored data value in a previously stored data element of a previously stored data structure, and store the probability of certainty associated with the data value in the data structure. The processor is also configured to store the data value in a data element of a data structure, and determine, using an adaptive filter, a probability of certainty associated with the data value. The probability of certainty associated with the data value also depends at least in part on a time since the data value was updated, verified, or validated.

Figure 2:
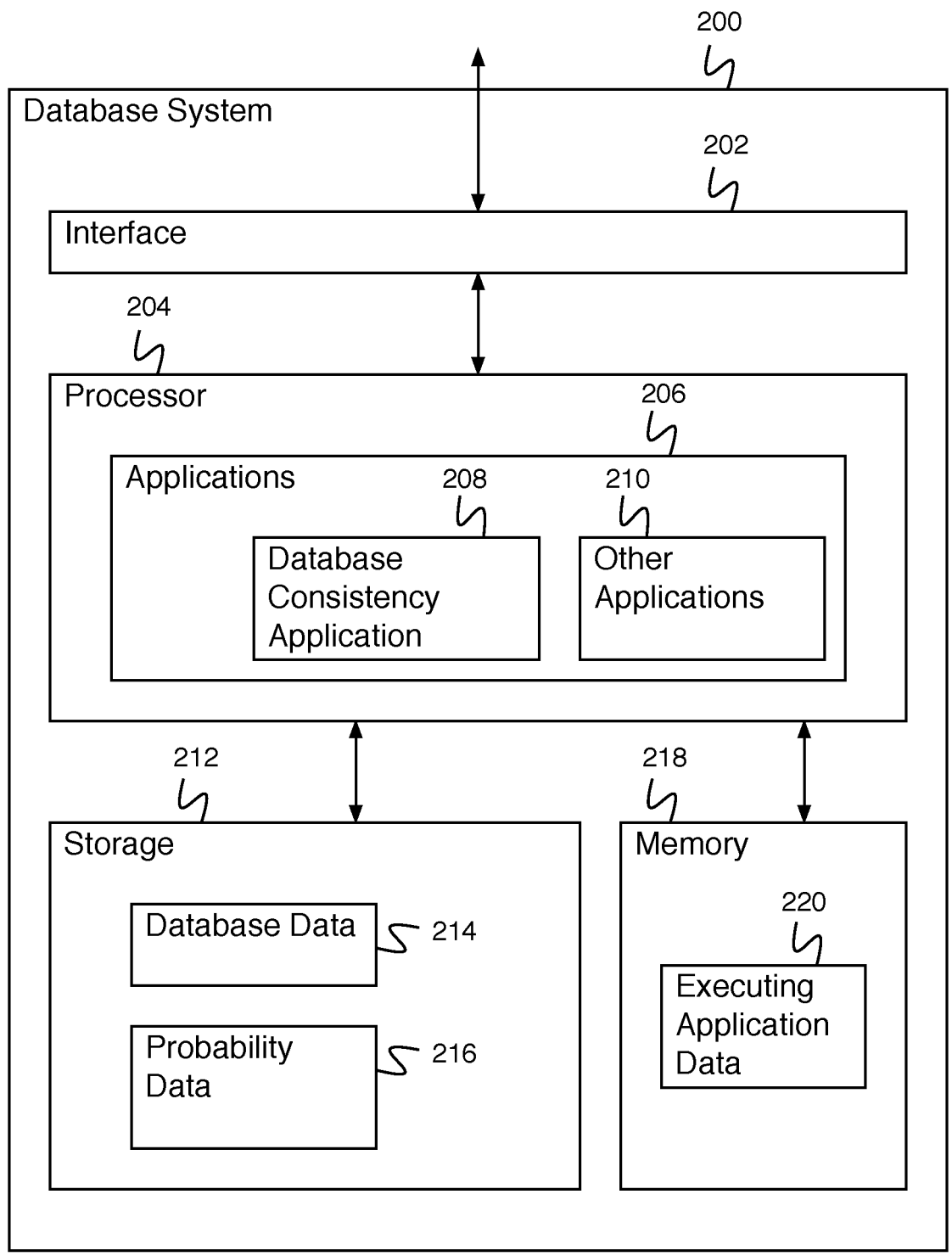
FIG. 2 is a block diagram illustrating an embodiment of a database system.

FIG. 2 is a block diagram illustrating an embodiment of a database system. In some embodiments, database system 200 of FIG. 2 comprises database system 106 of FIG. 1. In the example shown, database system 200 comprises interface 202. Interface 202 comprises an interface for communicating with external systems using a network. For example, interface 202 comprises an interface for communicating with a user system (e.g., for receiving database data, for receiving a request for a report, etc.). Processor 204 comprises a processor for executing applications 206. Applications 206 comprise database consistency application 208 and other applications 210. For example, database consistency application 208 stores a data value in a data element of a data structure, determines a probability of certainty associated with the data value, wherein the probability of certainty associated with the data value is based at least in part on consistency with a previously stored data value in a previously stored data element of a previously stored data structure, and stores the probability of certainty associated with the data value in the data structure. The probability of certainty associated with the data value also depends at least in part on a time since the data value was updated, verified, or validated. Other applications 210 comprises any other appropriate applications (e.g., a communications application, a chat application, a web browser application, a document preparation application, a data storage and retrieval application, a user interface application, a data analysis application, etc.). Database system 200 additionally comprises storage 212. Storage 212 comprises database data 214 (e.g., data stored in the database for future retrieval or processing) and probability data 216 (e.g., probability of certainty data associated with database data 214). For example, database data comprises data stored in an object tree or data stored in a table. Database system 200 additionally comprises memory 218. Memory 218 comprises executing application data 220 comprising data associated with applications 206.

Figure 3:
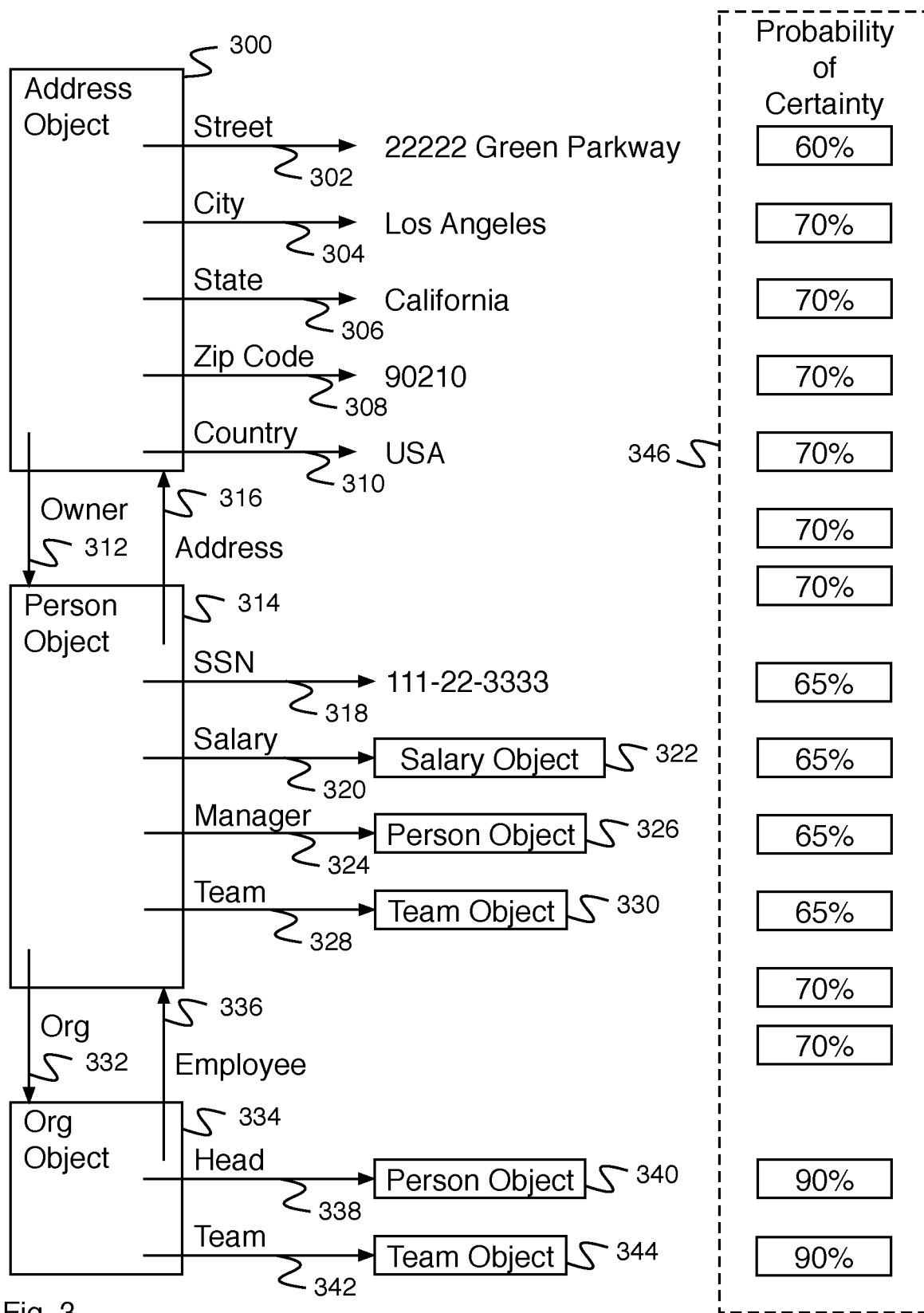
FIG. 3 is a block diagram illustrating an embodiment of data stored in an object tree.

FIG. 3 is a block diagram illustrating an embodiment of data stored in an object tree. In some embodiments, the object tree of FIG. 3 comprises an object tree stored in database data 214 of FIG. 2. In the example shown, address object 300 comprises an object for storing address data representing an address. Address object 300 comprises a set of data values stored in data elements. Street data element 302 comprises a data element for storing street address data. Street data element 302 comprises the data "22222 Green Parkway" with an associated probability of certainty of 60%. City data element 304 comprises a data element for storing city data. City data element 304 comprises the data "Los Angeles" with an associated probability of certainty of 70%. State data element 306 comprises a data element for storing state data. State data element 306 comprises the data "California" with an associated probability of certainty of 70%. Zip code data element 308 comprises a data element for storing zip code data. Zip code data element 308 comprises the data "90210" with an associated probability of certainty of 70%. Country data element 310 comprises a data element for storing country data. Country data element 310 comprises the data "USA" with an associated probability of certainty of 70%. Address object 300 additionally comprises owner relation 312 (with associated probability of 70%) to person object 314 (with associated probability of 70%). Person object 314 comprises a person object for storing data elements and relations representing a person. Address relation 316 comprises a relation to address object 300. SSN data element 318 comprises a data element for storing social security number data. SSN data element 318 comprises the data "111-22-3333" with an associated probability of certainty of 65%. Salary relation 320 (with associated probability of 65%) comprises a relation to salary object 322. Manager relation 324 (with associated probability of 65%) comprises a relation to person object 326. Team relation 328 (with associated probability of 65%) comprises a relation to team object 330. Org relation 332 (with associated probability of 70%) comprises a relation to org object 334. Org object 334 comprises a data object storing relations representing an organization. Employee relation 336 (with associated probability of 70%) comprises a relation to person object 314. Head relation 338 (with associated probability of 90%) comprises a relation to person object 340. Team relation 342 (with associated probability of 90%) comprises a relation to team object 344. In some embodiments, team object 344 comprises the same object as team object 330. Each data element and relation of the object tree is associated with a value in probabilities of certainty 346. For example, probabilities of certainty 346 are determined based at least in part on data consistency with a set of other similar data. In some embodiments, probabilities of certainty 346 are based on other factors. In some embodiments, probabilities of certainty 346 are stored in probability data 216 of FIG. 2.

In some embodiments, in addition to probabilities of certainty 346 there are errors associated with probabilities of certainty346 stored for each data value. In some embodiments, there is a composite value for error stored that comprises an aggregate value for the errors associated with the probabilities of certainty 346.

FIG. 4 is a block diagram illustrating an embodiment of data stored in a table. In some embodiments, the data table of FIG. 4 comprises a data table stored in database data 214 of FIG. 2. In some embodiments, the data table of FIG. 4 comprises a data table corresponding to the data stored by a set of address objects including address object 300 of FIG. 3. In the example shown, each column of the table of FIG. 4 comprises a data field associated with an address. ID column 400 comprises a column for storing identifiers associated with address data (e.g., an identifier for identifying address data in a cell of another table). ID data in ID column 400 comprises 234522, 234525, 234539, and 234547. Street column 402 comprises a column for storing street data. Street data in column street column 402 comprises 22222 Green Parkway with associated probability of 60%, 4592 Reds Road with associated probability of 60%, 15973 Angel Drive with associated probability of 60%, and 84 Shady Glen with associated probability of 60%. City column 404 comprises a column for storing city data. City data in city column 404 comprises Los Angeles with associated probability of 70%, Los Angeles with associated probability of 70%, Los Angeles with associated probability of 70%, and Los Angeles with associated probability of 70%. State column comprises a column for storing state data. State data in state column 406 comprises California with associated probability of 70%, California with associated probability of 70%, California with associated probability of 70%, and California with associated probability of 70%. Zip code column 408 comprises a column for storing zip code data. Zip code data in zip code column 410 comprises 90210 with associated probability of 70%, 90210 with associated probability of 70%, 90210 with associated probability of 70%, and 90210 with associated probability of 70%. Country column 410 comprises a column for storing country data. Country data in country column 410 comprises USA with associated probability of 70%, USA with associated probability of 70%, USA with associated probability of 70%, and USA with associated probability of 70%. In the example shown, each cell associated with street column 402, city column 404, state column 406, zip code column 408, and country column 410 is associated with a probability of certainty. In some embodiments, probability of certainty data is stored in probability data 216 of FIG. 2.

Figure 5:
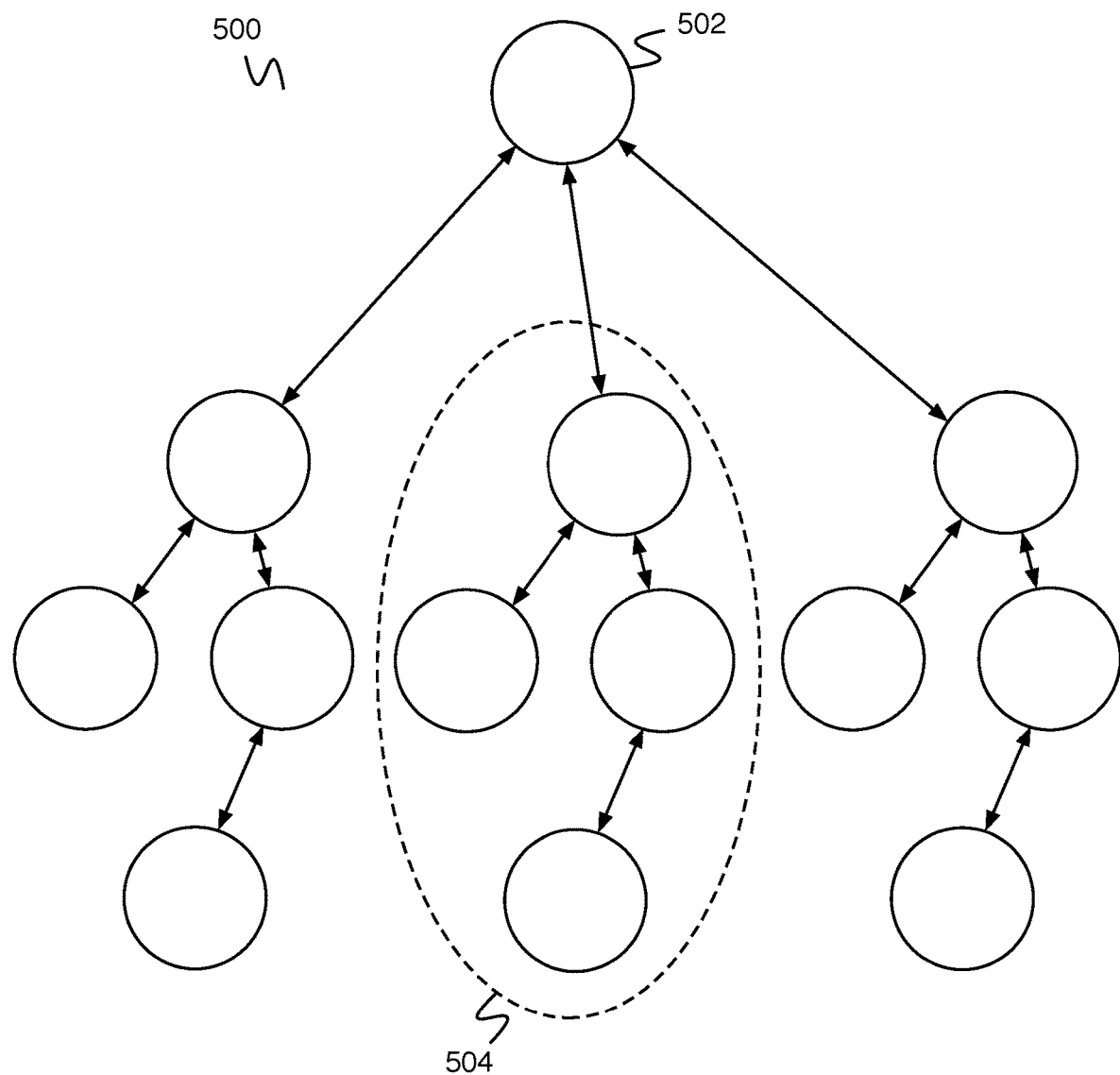
FIG. 5 is a diagram illustrating an embodiment of an object tree.

FIG. 5 is a diagram illustrating an embodiment of an object tree. In some embodiments, object tree 500 comprises database data stored in database data 214 of FIG. 2. In the example shown, object tree 500 comprises a plurality of objects (e.g., object 502). Set of related objects 504 comprises a set of objects, wherein it is determined that the objects are related. In the example shown, set of related objects 504 comprises a subtree of the object tree, for example, representing a subdivision or location of a larger organization. For set of related objects 504, each object comprises a data value wherein the probability of certainty associated with the data value is based at least in part on a consistency with the data values of the other objects of the set of related objects 504.

Figure 6:
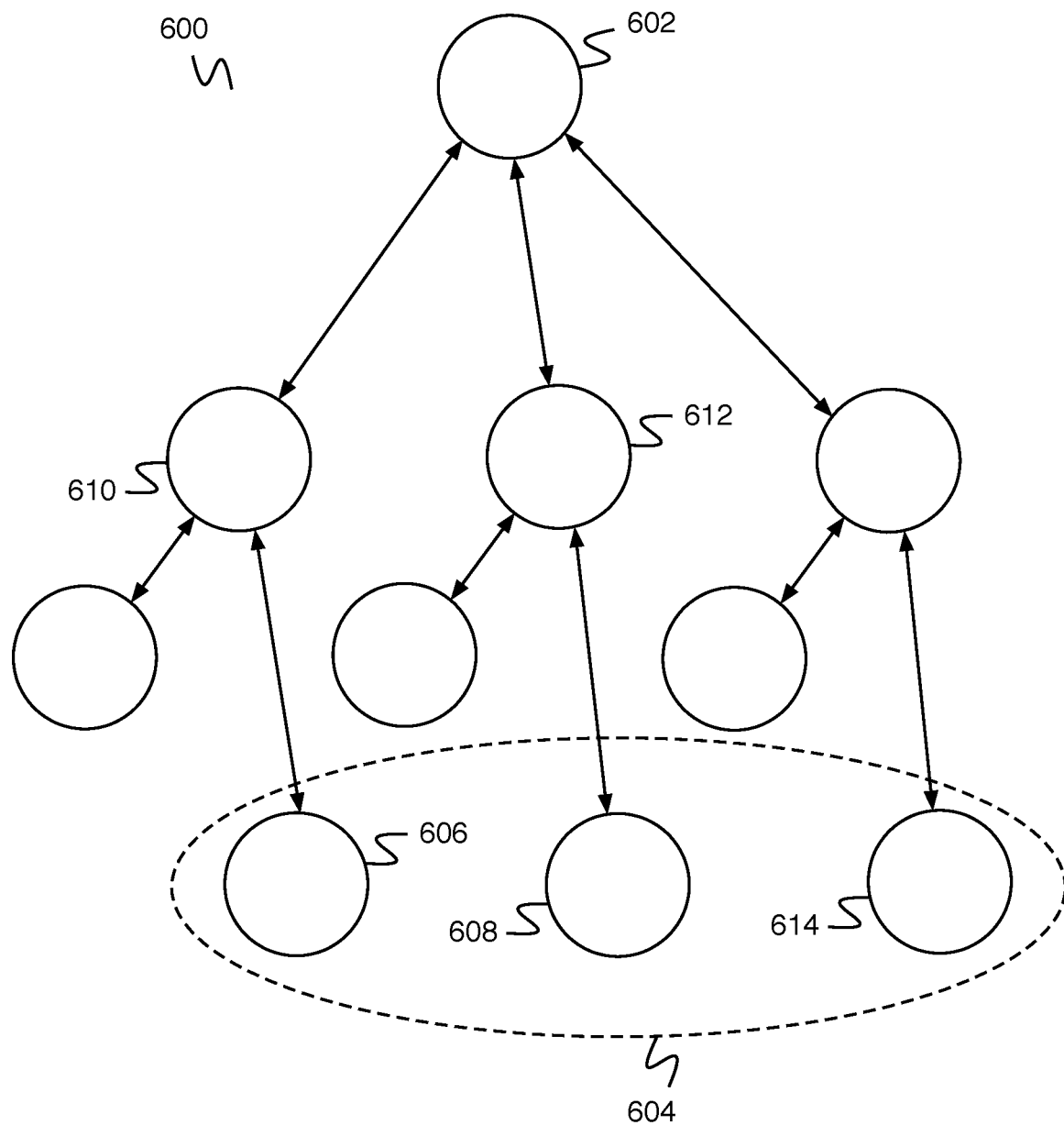
FIG. 6 is a diagram illustrating an embodiment of an object tree.

FIG. 6 is a diagram illustrating an embodiment of an object tree. In some embodiments, object tree 600 comprises database data stored in database data 214 of FIG. 2. In the example shown, object tree 600 comprises a plurality of objects (e.g., object 602). Set of related objects 604 comprises a set of objects, wherein it is determined that the objects are related. In the example shown, set of related objects 604 comprises a set of objects, each object at the same position within a set of analogous subtrees. For example, each object of set of related objects 604 comprises an address object, wherein the address object is related to an employee, wherein each employee comprises an employee of the same organization. For set of related objects 604, each object comprises a data value wherein the probability of certainty associated with the data value is based at least in part on a consistency with the data values of the other objects of the set of related objects 604.

For example, object 606 comprises a data structure comprising a data element storing a data value that has been received for storing, and object 608 comprises a previously stored data structure comprising a previously stored data element storing a previously stored data value. In some embodiments, a data element type of the data element of object 606 matches a previously stored data element type of the previously stored data element. For example, the data element type and the previously stored data element type comprise Zip Code. In some embodiments, a data structure type of the data structure (e.g., object 606) matches a previously stored data structure type of the previously stored data structure (e.g., object 608). For example, object 606 and object 608 comprise address objects. In some embodiments, the data structure (e.g., object 606) has a first relation with a first entity (e.g., object 610), the previously stored data structure (e.g., object 608) has a second relation with a second entity (e.g., object 612), and the first entity and the second entity are similar. For example, object 610 and object 612 comprise objects that are similar. In some embodiments, a first entity and a second entity being similar comprises a first entity and a second entity that are the same type. For example, the first entity (e.g., object 610) and the second entity (e.g., object 612) are both person objects. In some embodiments, a first entity and a second entity being similar comprises the first entity and the second entity both have a relation with a specific third entity. For example, the first entity (e.g., object 610) and the second entity (e.g., object 612) comprise person objects each with a relationship to a third entity (e.g., object 602) comprising an organization object. In some embodiments, the previously stored data value comprises one of a plurality of data values (e.g., comprising a data value of object 608, a data value of object 614, and any other appropriate data values). In some embodiments, object 614 is similar to object 608 and has similar relations to object 608.

Figure 7A:
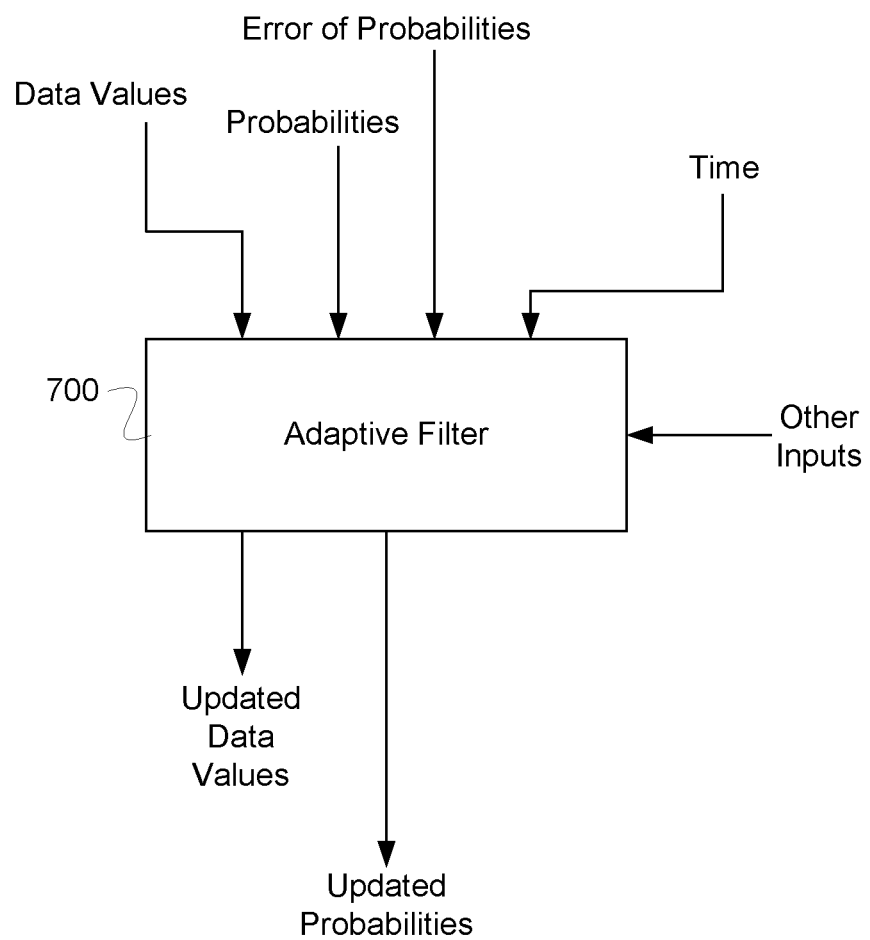
FIG. 7A is a block diagram illustrating an embodiment of an adaptive filter for updating probabilities.

FIG. 7A is a block diagram illustrating an embodiment of an adaptive filter for updating probabilities. In some embodiments, the adaptive filter of FIG. 7A is used to implement database consistency application 208 of FIG. 2. In the example shown, adaptive filter 700 receives data values, probabilities, error of probabilities, and time as inputs. Adaptive filter 700 has updated probabilities and updated data values (e.g., as potential suggestions for updating the data values). The system itself is configured to constantly readjust the probabilities triggered by changes to the system (e.g., an input or calculation of a data value) or the passage of time (e.g., the reduction or decay of probability of certainty over time). The system can also request user help to validate data it believes is invalid, or probabilities it is uncertain about (e.g., the error in the probability estimate is high). In some embodiments, the system does not just track data and probabilities, but data, probabilities, and error estimates on the probabilities. The system also naturally decays the probabilities over time unless something causes the probability to go up (e.g., new data, user intervention, etc.) to model changes to data that are not propagated to the system itself. With respect to the probabilities and error estimates on probabilities, the system that is setting the probabilities uses adaptive filter 700. Adaptive filter 700 takes in a variety of different inputs (e.g., other inputs such as time since last adjustment, rate of change, ML on similar data, etc.). Adaptive filter 700 closes its loop on minimizing error in the probability of the data values, such that it is similar to a third order effect.

Figure 7B:
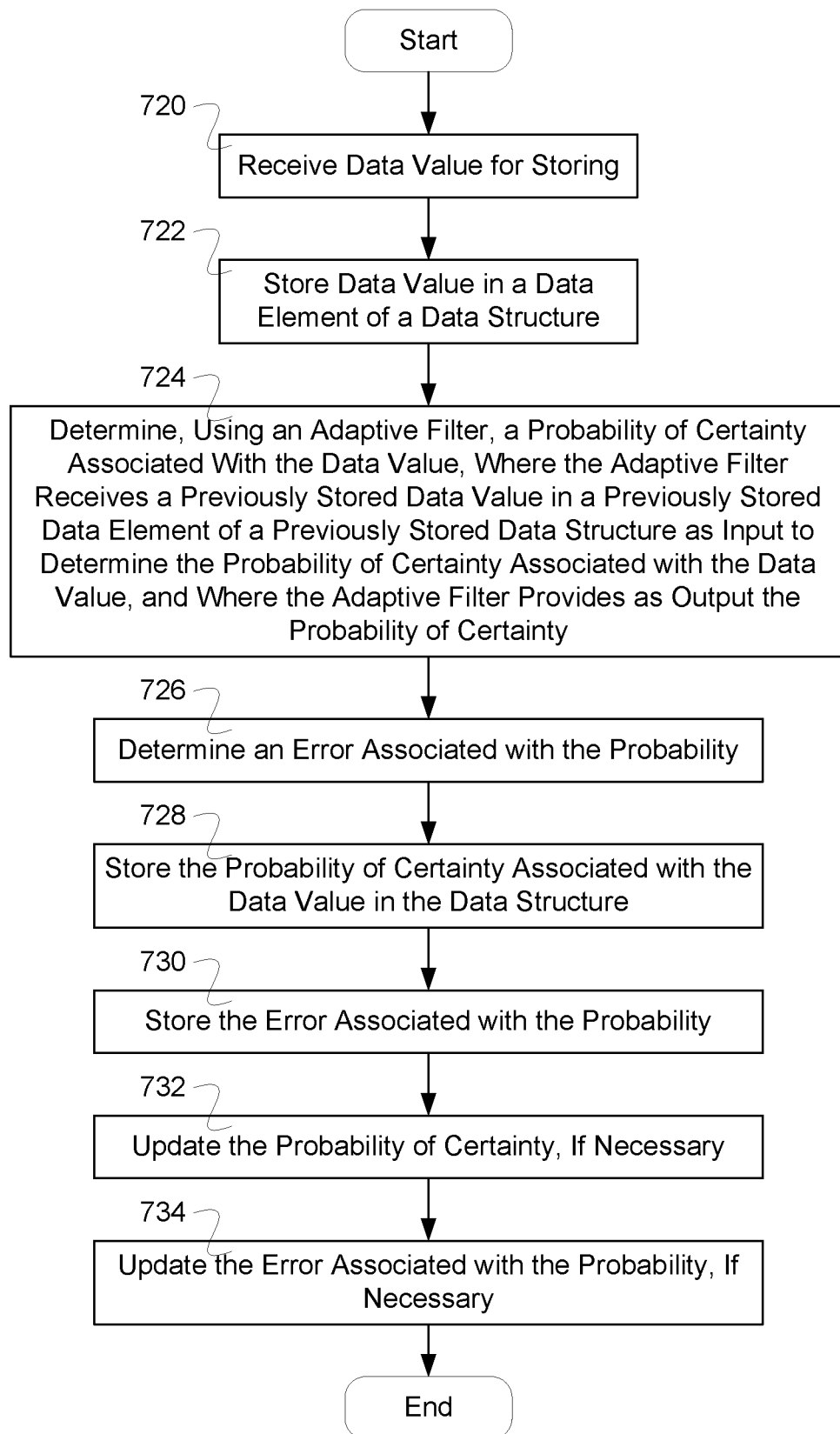
FIG. 7B is a flow diagram illustrating an embodiment of a process for maintaining consistency of a data value using a probability.

FIG. 7B is a flow diagram illustrating an embodiment of a process for maintaining consistency of a data value using a probability. In some embodiments, the process of FIG. 7B is executed by database system 106 of FIG. 1. In the example shown, in 720, a data value is received for storing. In 722, the data value is stored in a data element of a data structure. For example, the data value is stored in a data element of an object or in a cell of a table. In 724, a probability of certainty associated with the data value is determined using an adaptive filter, wherein the adaptive filter receives a previously stored data value in a previously stored data element of a previously stored data structure as input to determine the probability of certainty associated with the data value, and wherein the adaptive filter provides as output the probability of certainty. For example, a newly entered value is evaluated for its consistency with other values already stored in the data structure and a probability is assigned or adjusted based on this using an adaptive filter. In some embodiments, the value is checked against similar values in the data structure (e.g., an employee number is checked against another employee number of people hired the same day). In some embodiments, the value is checked against related values in the data structure (e.g., the home address of an employee is checked against the address of a dependent of the employee as indicated in their health insurance information). In some embodiments, the probability is increased from a default value for a newly entered piece of data in response to being consistent. In some embodiments, the probability is decreased from a default value for a newly entered piece of data in response to being inconsistent. In 726, an error associated with the probability is determined. In 728, the probability of certainty associated with the data value in the data structure is stored. In 730, the error associated with the probability is stored. In 732, the probability of certainty is updated, if necessary. For example, the probability of certainty is updated according to a schedule, the probability of certainty is updated in the event that the previously stored data value in the previously stored data element of the previously stored data structure is updated, the probability of certainty is updated in the event that another data value is received for storing, etc. In some embodiments, the probability is increased from a current value for a piece of data in response to being consistent with a changed or newly entered piece of data. In some embodiments, the probability is decreased from a current value for a piece of data in response to being inconsistent with a changed or newly entered piece of data. In 734, the error associated with the probability is updated if necessary.

In some embodiments, the errors in the probability of the data values are modeled for each input to the probability of certainty calculation. These models can be simple or complex, stochastic, etc, but ideally based on some idea about the input source including constraints (e.g., a person's age only ever increases monotonically—for example, it can be modeled as linearly increasing to a point where it levels off). Also, any other behavior should increase error in the event that age is an input to some other probability. Errors are combined to create a composite error (e.g., simplistically this is an error weighted normalized superposition, assuming the inputs are orthogonal, more likely this is an n-stage Kalman filter). Each error model is updated at each time step with any changes due to new data or simply the change in time, etc. and the probability is then recalculated as well as and the composite error. As an example, for the case where a determination of whether someone has reached retirement age is to be made—inputs might be age, birthdate, location etc.—if age and birthdate disagree the error models for each one deweights the worse one (e.g., if age isn't monotonically increasing or if birthdate had any changes at all).

Figure 7C:
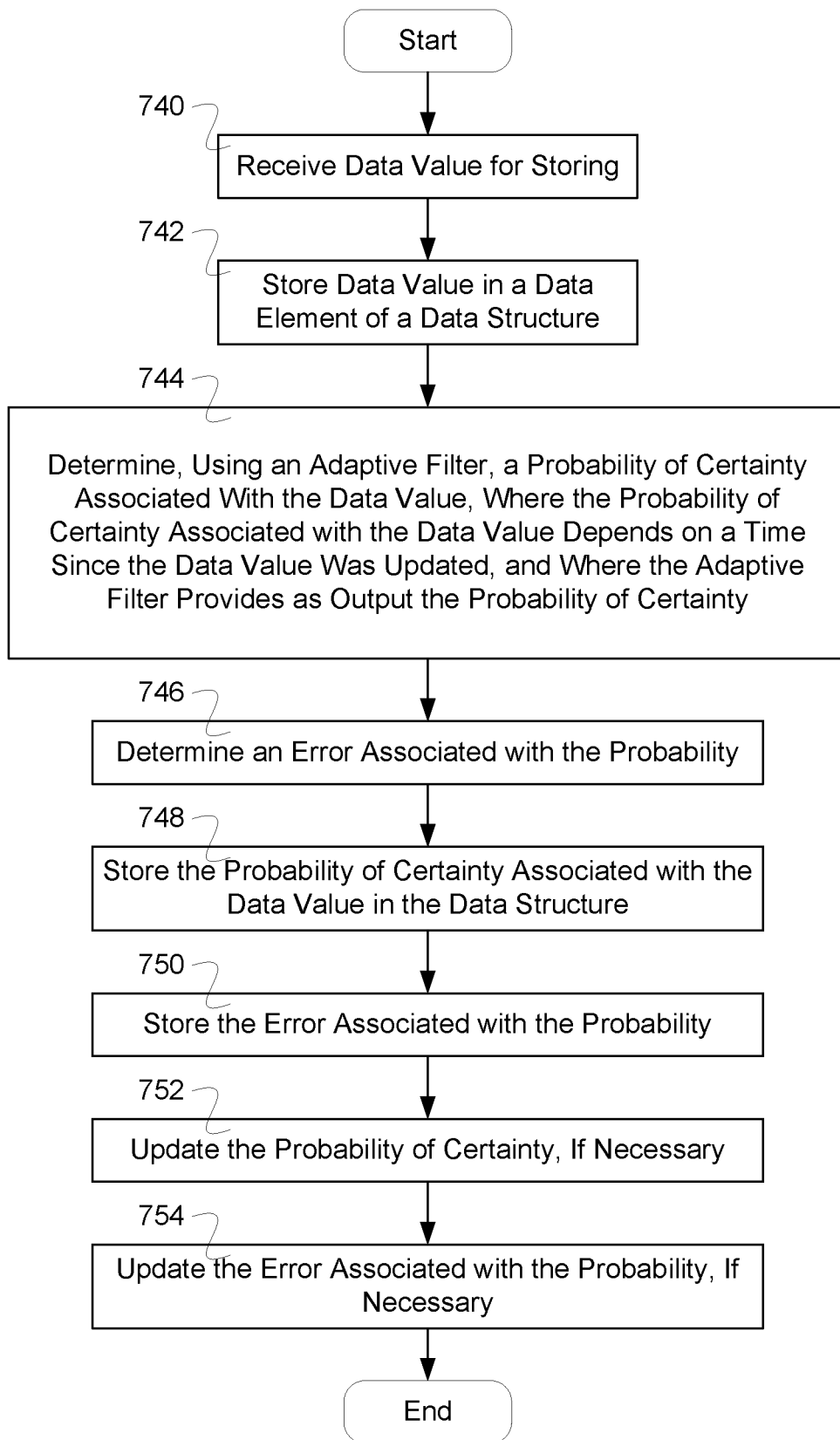
FIG. 7C is a flow diagram illustrating an embodiment of a process for time dependency of a data value using a probability.

FIG. 7C is a flow diagram illustrating an embodiment of a process for time dependency of a data value using a probability. In some embodiments, the process of FIG. 7C is executed by database system 106 of FIG. 1. In the example shown, in 740, a data value is received for storing. In 742, the data value is stored in a data element of a data structure. For example, the data value is stored in a data element of an object or in a cell of a table. In 744, a probability of certainty associated with the data value is determined using an adaptive filter, wherein the probability of certainty associated with the data value depends on a time since the data value was updated, and wherein the adaptive filter provides as output the probability of certainty. For example, a newly entered value is assigned a value and evaluated for its consistency with other values already stored in the data structure (e.g., similar values) and a probability is adjusted based on this using an adaptive filter. In some embodiments, the value is checked against similar values in the data structure (e.g., an employee number is checked against another employee number of people hired the same day). In some embodiments, the value is checked against related values in the data structure (e.g., the home address of an employee is checked against the address of a dependent of the employee as indicated in their health insurance information). In some embodiments, the probability is increased from a default value for a newly entered piece of data in response to being consistent. In some embodiments, the probability is decreased from a default value for a newly entered piece of data in response to being inconsistent. In some embodiments, the probability value is decreased over time (e.g., the value follows a decreasing function, the value follows a linearly decreasing function, the value follows an exponential decay function, etc.). In 746, an error associated with the probability is determined. In 748, the probability of certainty associated with the data value in the data structure is stored. In 750, the error associated with the probability is stored. In 752, the probability of certainty is updated, if necessary. For example, the probability of certainty is updated according to a schedule, the probability of certainty is updated in the event that the previously stored data value in the previously stored data element of the previously stored data structure is updated, the probability of certainty is updated in the event that another data value is received for storing, etc. In some embodiments, the probability is increased from a current value for a piece of data in response to being consistent with a changed or newly entered piece of data. In some embodiments, the probability is decreased from a current value for a piece of data in response to being inconsistent with a changed or newly entered piece of data. In 754, the error associated with the probability is updated if necessary.

Figure 8:
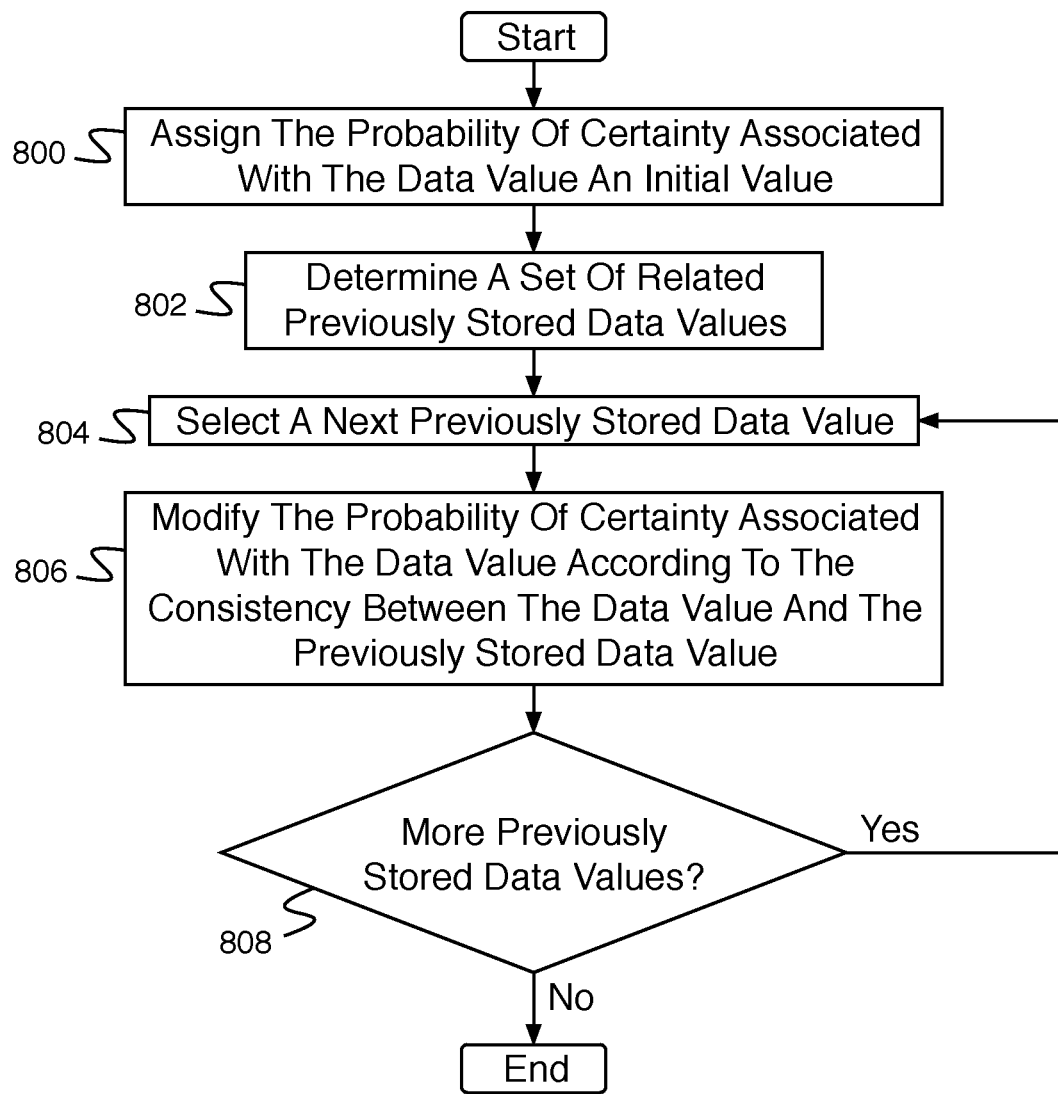
FIG. 8 is a flow diagram illustrating an embodiment of a process for determining a probability of certainty associated with a data value.

FIG. 8 is a flow diagram illustrating an embodiment of a process for determining a probability of certainty associated with a data value. In some embodiments, the process of FIG. 8 implements 724 of FIG. 7B. In the example shown, in 800, the probability of certainty associated with the data value is assigned an initial value. In 802, a set of related previously stored data values are determined. For example, the set of related previously stored data values are indicated as the relevant data that is important as input to an adaptive filter used to determine the probability of certainty associated with a given data value. In 804, a next previously stored data value is selected. In some embodiments, the next previously stored data value comprises the first previously stored data value. In 806, the probability of certainty associated with the data value is modified according to the consistency between the data value and the previously stored data value. For example, the probability of certainty associated with the data value is adjusted up or down. In some embodiments, the adjustment is determined using an adaptive filter. In various embodiments, the probability of certainty associated with the data value is modified according to a determined consistency between the data value and the previously stored data value (e.g., identical, analogous, distinct, or disparate), or the probability of certainty is modified based at least in part on a model (e.g., a Kalman filter model, a Markov model, an applied optimal estimation model, a machine learning model, or a neural network model). In 808, it is determined whether there are more previously stored data values. In the event it is determined that there are more previously stored data values, control passes to 804. In the event it is determined that there are not more previously stored data values, the process ends.

Figure 9:
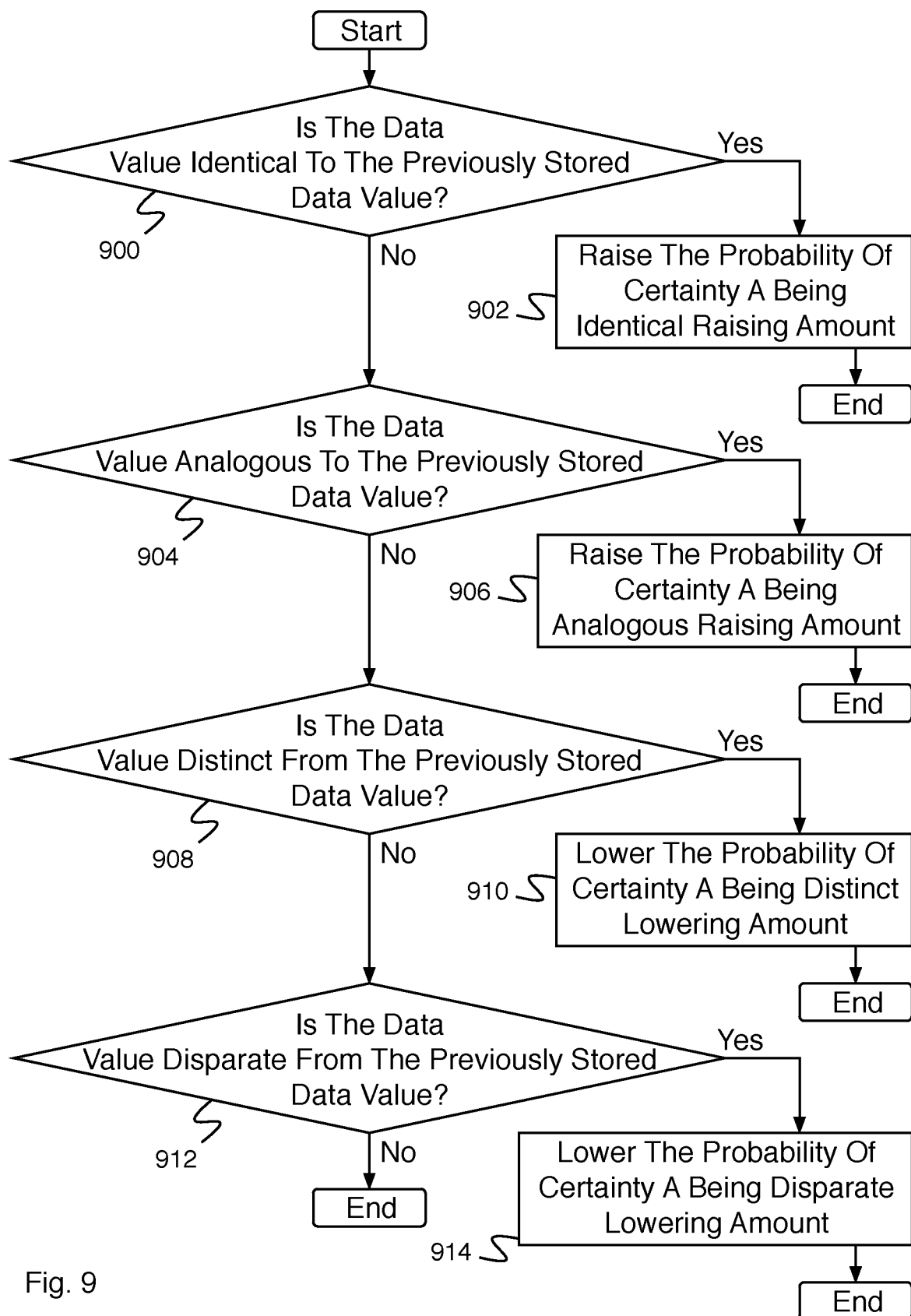
FIG. 9 is a flow diagram illustrating an embodiment of a process for modifying a probability of certainty associated with a data value according to a consistency between the data value and a previously stored data value.

FIG. 9 is a flow diagram illustrating an embodiment of a process for modifying a probability of certainty associated with a data value according to a consistency between the data value and a previously stored data value. In some embodiments, the process of FIG. 9 implements 806 of FIG. 8. In the example shown, in 900, it is determined whether the data value is identical to the previously stored data value. In response to determining that the data value is identical to the previously stored data value, control passes to 902. In 902, the probability of certainty is raised a being identical raising amount, and the process ends. In response to determining in 900 that the data value is not identical to the previously stored data value, control passes to 904. In 904, it is determined whether the data value is analogous to the previously stored data value. For example, analogous comprises similar, nearly identical, having the same meaning, different by an amount less than an distinct difference threshold, etc. In response to determining that the data value is analogous to the previously stored data value, control passes to 906. In 906, the probability of certainty is raised a being analogous raising amount, and the process ends. For example, the being analogous raising amount is less than the being identical raising amount. In 904, in response to determining that the data value is not analogous to the previously stored data value, control passes to 908. In 908, it is determined whether the data value is distinct from the previously stored data value. For example, distinct comprises measurably different, meaningfully different, different by an amount between a distinct difference threshold and a disparate difference threshold, etc. In response to determining in 908 that the data value is distinct from the previously stored data value, control passes to 910. In 910, the probability of certainty is lowered by a being distinct lowering amount, and the process ends. In 908, in response to determining that the data value is not distinct from the previously stored data value, control passes to 912. In 912, it is determined whether the data value is disparate from the previously stored data value. For example, disparate comprises very different, categorically different, different by an amount greater than a disparate difference threshold, etc. In the event it is determined that the data value is disparate from the previously stored data value, control passes to 914. In 914, the probability of certainty is lowered by a being disparate lowering amount, and the process ends. For example, the being disparate lowering amount is greater than the being distinct lowering amount. In response to determining in 912 that the data value is not disparate from the previously stored data value (e.g., the data value is none of identical, analogous, distinct, or disparate from the previously stored data value), the process ends. In some embodiments, the consistency of the data value and the previously stored data value is always one of identical, analogous, distinct, or disparate.

In various embodiments, the steps 900, 904, 908, and 912 are performed in a different order, in parallel, or any combination of serial and parallel.

Figure 10:
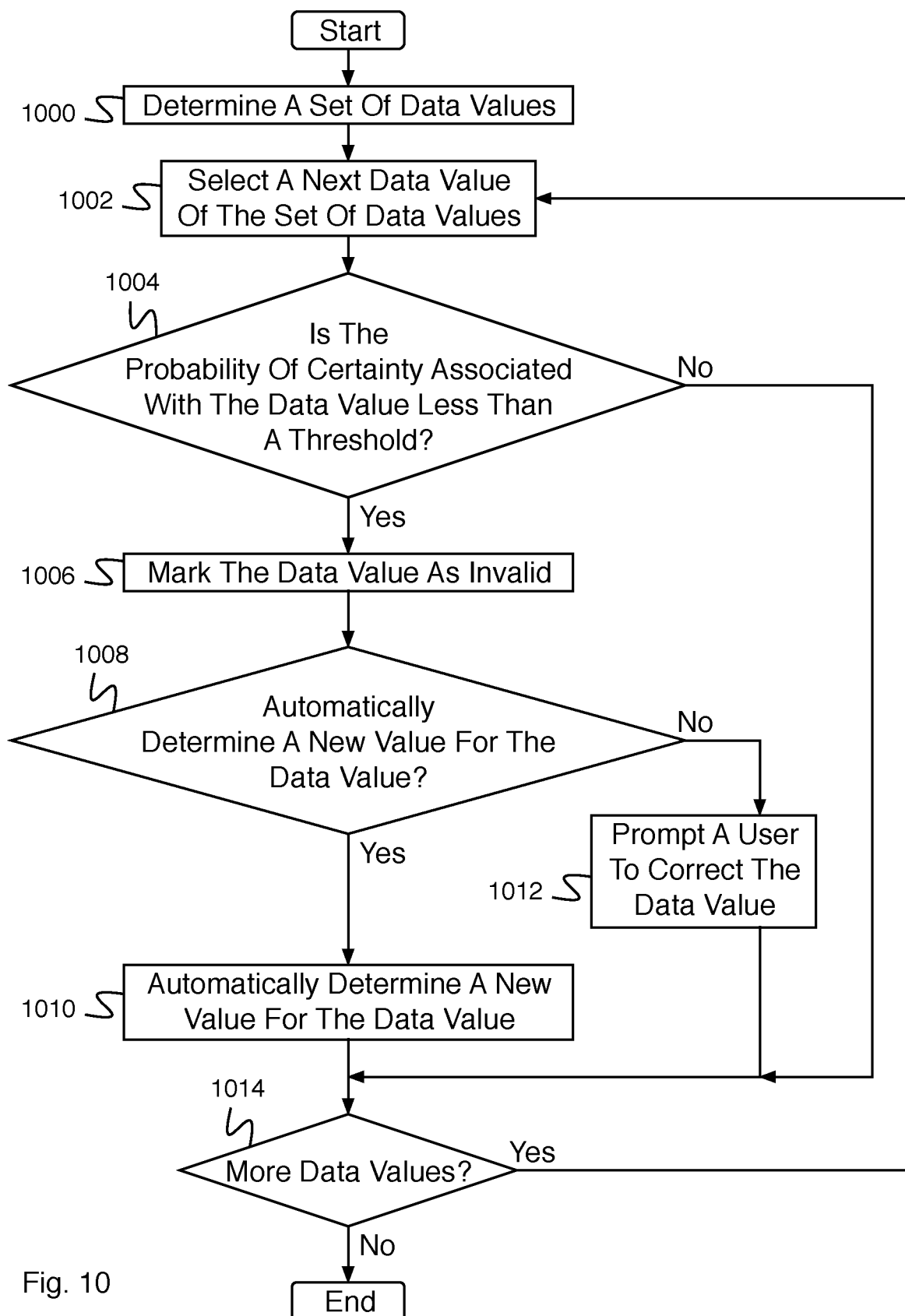
FIG. 10 is a flow diagram illustrating an embodiment of a process for correcting data.

FIG. 10 is a flow diagram illustrating an embodiment of a process for correcting data. In some embodiments, the process of FIG. 10 is executed by database system 106 of FIG. 1 for correcting data. In the example shown, in 1000, a set of data values is selected. For example, the set of data values comprises a data value of a database system, a selected set of data values, a set of recently added data values, etc. In 1002, a next data value of the set of data values is selected. In some embodiment, the next data value comprises the first data value. In 1004, it is determined whether the probability of certainty associated with the data value is less than a threshold. In response to determining that the probability of certainty associated with the data value is not less than a threshold, control passes to 1014. In response to determining that the probability of certainty is less than a threshold, control passes to 1006. In 1006, the data value is marked as invalid. In 1008, it is determined whether to automatically determine a new value for the data value. For example, it is determined whether to automatically determine a new value for the data value based at least in part on an administrator setting, on an ability to automatically determine a new value, on a user availability, etc. In response to determining to automatically determine a new value for the data value, control passes to 1010. In 1010 a new value for the data value is automatically determined. For example, the new value is based at least in part on a previously stored data value in a previously stored data element of a previously stored data structure or on a model. Control then passes to 1014. In response to determining in 1008 not to automatically determine a new value for the data value, control passes to 1012. In 1012, a user is prompted to correct the data value, and control then passes to 1014. For example, a user is prompted to correct the data value and the new value entered is stored in the database and assigned a probability. In some embodiments, associated values are displayed to the user that are or were inconsistent to indicate the reason for prompting a user to update the data value. In some embodiments, the user is able to update associated values that are inconsistent with the original prompted value and those values are updated and stored with updated probabilities. In 1014, it is determined whether there are more data values (e.g., more data values of the set of data values). In response to determining that there are more data values, control passes to 1002. In response to determining that there are not more data values, the process ends.

Figure 11:
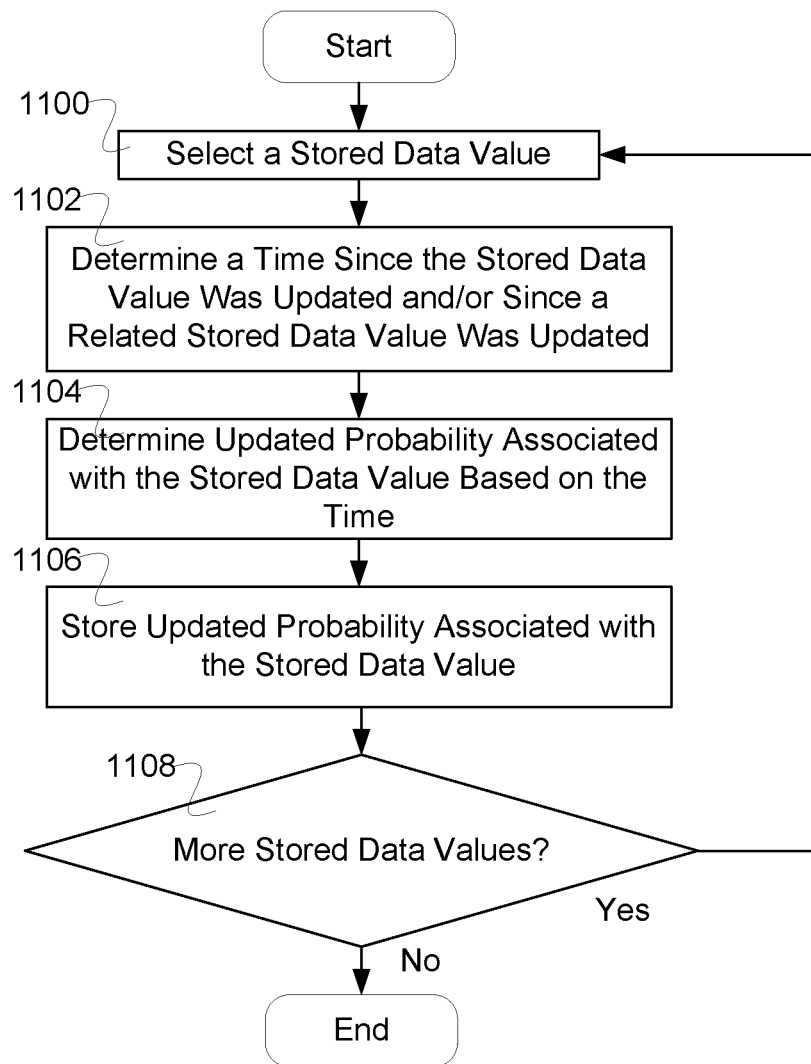
FIG. 11 is a flow diagram illustrating a process for determining an updated probability.

FIG. 11 is a flow diagram illustrating a process for determining an updated probability. In some embodiments, the process of FIG. 11 is used to implement a portion of 744 of FIG. 7C. In the example shown, in 1100 a stored data value is selected. In 1102, a time is determined since the stored data value was updated and/or since a related stored data value was updated. In 1104, updated probability is determined associated with the stored data value based on the time. In 1106, an updated probability is stored associated with the stored data. In 1108, it is determined whether there are more stored data values. In response to determining that there are no more stored data values, the process ends. In response to determining that there are more stored data values, control passes to 1100.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for maintaining consistency of a data value using a probability, comprising:
an interface configured to:
receive a data value for storing; and
a hardware processor configured to:
store the data value in a data element of a data structure;
determine, using an adaptive filter, a probability of certainty that the data value is correct based at least in part on a consistency of the data value with a set of related previously stored data values in previously stored data elements of a previously stored data structure, wherein the adaptive filter receives the set of related previously stored data values as input to determine the probability of certainty associated with the data value, and wherein the adaptive filter provides as output the probability of certainty;
store the probability of certainty associated with the data value in the data structure;
reduce the probability of certainty associated with the data value to a reduced probability of certainty based at least in part on an amount of time since the data value was updated;
determine whether the reduced probability of certainty associated with the data value is below a threshold; and
in response to a determination that the reduced probability of certainty associated with the data value is below the threshold:
determine a new data value;
store the new data value in the data structure;
determine a new probability of certainty associated with the new data value; and
store the new probability of certainty associated with the new data value in the data structure.

2. The system of claim 1, wherein the processor is further configured to determine an error associated with the probability of certainty associated with the data value.

3. The system of claim 2, wherein the adaptive filter minimizes the error when providing output.

4. The system of claim 1, wherein a data element type of the data element matches a previously stored data element type of the previously stored data elements.

5. The system of claim 1, wherein a data structure type of the data structure matches a previously stored data structure type of the previously stored data structure.

6. The system of claim 1, wherein the data structure has a first relation with a first entity, the previously stored data structure has a second relation with a second entity, and the first entity and the second entity are similar.

7. The system of claim 6, wherein similar comprises that the first entity and the second entity are both instances of a specific entity type.

8. The system of claim 6, wherein similar comprises that the first entity and the second entity both have a relation with a specific third entity.

9. The system of claim 1, wherein the set of related previously stored data values comprises a plurality of related previously stored data values.

10. The system of claim 1, wherein the probability of certainty associated with the data value is assigned an initial value.

11. The system of claim 10, wherein the probability of certainty associated with the data value is raised an identical raising amount from the initial value in response to the data value being identical to a previously stored data value.

12. The system of claim 11, wherein the probability of certainty associated with the data value is raised an analogous raising amount from the initial value in response to the data value being analogous to the previously stored data value, wherein the being analogous raised amount is less than the being identical raised amount.

13. The system of claim 10, wherein the probability of certainty associated with the data value is lowered a being distinct lowering amount from the initial value in response to the data value being distinct from the previously stored data value.

14. The system of claim 13, wherein the probability of certainty associated with the data value is lowered a being disparate lowering amount from the initial value in response to the data value being disparate from the previously stored data value, wherein the being disparate lowering amount is greater than the being distinct lowering amount.

15. The system of claim 1, wherein the probability of certainty associated with the data value is modified based at least in part on a model.

16. The system of claim 15, wherein the model comprises a Kalman filter model, a Markov model, an applied optimal estimation model, a machine learning model, or a neural network model.

17. The system of claim 1, wherein the processor is further configured to prompt a user to correct the data value in response to determining that the reduced probability of certainty associated with the data value is below the threshold.

18. The system of claim 1, wherein the new data value is based at least in part on a related previously stored data value.

19. The system of claim 1, wherein the new data value is based at least in part on a model.

20. The system of claim 1, wherein the probability of certainty is updated to an updated probability of certainty.

21. The system of claim 20, wherein the probability of certainty is updated according to a schedule or in response to another data value being received for storing.

22. The system of claim 1, wherein the processor is further configured to store the reduced probability of certainty in the data structure.

23. A method for maintaining consistency of a data value using a probability, comprising:
receive a data value for storing;
storing the data value in a data element of a data structure;
determining, using an adaptive filter, a probability of certainty that the data value is correct based at least in part on a consistency of the data value with a set of related previously stored data values in previously stored data elements of a previously stored data structure, wherein the adaptive filter receives the set of related previously stored data values as input to determine the probability of certainty associated with the data value, and wherein the adaptive filter provides as output the probability of certainty;
storing the probability of certainty associated with the data value in the data structure;
reducing the probability of certainty associated with the data value to a reduced probability of certainty based at least in part on an amount of time since the data value was updated;
determining whether the reduced probability of certainty associated with the data value is below a threshold; and
in response to a determination that the reduced probability of certainty associated with the data value is below the threshold:
determining a new data value;
storing the new data value in the data structure;
determining a new probability of certainty associated with the new data and value; and
storing the new probability of certainty associated with the new data value in the data structure.

24. A computer program product for maintaining consistency of a data value using a probability, the computer program product being embodied in a non-transitory computer readable storage medium and comprising computer instructions for:
receive a data value for storing;
storing the probability of certainty associated with the data value in the data structure;
reducing the probability of certainty associated with the data value to a reduced probability of certainty based at least in part on an amount of time since the data value was updated;
determining whether the reduced probability of certainty associated with the data value is below a threshold; and
in response to a determination that the reduced probability of certainty associated with the data value is below the threshold:
determining a new data value;
storing the new data value in the data structure;
determining a new probability of certainty associated with the new data and value; and
storing the new probability of certainty associated with the new data value in the data structure.

* * * * *